US009748595B2

(12) United States Patent
Li et al.

(10) Patent No.: US 9,748,595 B2
(45) Date of Patent: Aug. 29, 2017

(54) HIGH-ENERGY-DENSITY, AQUEOUS, METAL-POLYIODIDE REDOX FLOW BATTERIES

(71) Applicant: BATTELLE MEMORIAL INSTITUTE, Richland, WA (US)

(72) Inventors: Bin Li, Richland, WA (US); Zimin Nie, Richland, WA (US); Wei Wang, Kennewick, WA (US); Jun Liu, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 64 days.

(21) Appl. No.: 14/089,499

(22) Filed: Nov. 25, 2013

(65) Prior Publication Data

US 2015/0147673 A1 May 28, 2015

(51) Int. Cl.
*H01M 8/18* (2006.01)
*H01M 8/20* (2006.01)
(52) U.S. Cl.
CPC ............ *H01M 8/188* (2013.01); *H01M 8/20* (2013.01); *Y02E 60/528* (2013.01)
(58) Field of Classification Search
CPC .................................. H01M 8/188; H01M 8/20
See application file for complete search history.

(56) References Cited

U.S. PATENT DOCUMENTS

| 3,816,177 | A | * | 6/1974 | Walsh | H01M 10/365 429/105 |
|---|---|---|---|---|---|
| 4,049,886 | A | | 9/1977 | Will et al. | |
| 4,109,065 | A | * | 8/1978 | Will | H01M 10/365 429/105 |
| 4,485,154 | A | * | 11/1984 | Remick | H01M 4/66 429/105 |
| 4,889,779 | A | | 12/1989 | Connolly et al. | |
| 2012/0115069 | A1 | | 5/2012 | Noack et al. | |
| 2012/0135278 | A1 | | 5/2012 | Yoshie et al. | |
| 2013/0029187 | A1 | | 1/2013 | Cooper et al. | |
| 2013/0045399 | A1 | | 2/2013 | Cole et al. | |
| 2014/0141291 | A1 | | 5/2014 | Wang et al. | |

OTHER PUBLICATIONS

Soloveichik, Battery technologies for large-scale stationary energy storage, Mar. 2011, Annu. Rev. Chem. Biomol. Eng, 2, 503-527.*

(Continued)

*Primary Examiner* — Daniel Gatewood
(74) *Attorney, Agent, or Firm* — Klarquist Sparkman, LLP

(57) ABSTRACT

Improved metal-based redox flow batteries (RFBs) can utilize a metal and a divalent cation of the metal ($M^{2+}$) as an active redox couple for a first electrode and electrolyte, respectively, in a first half-cell. For example, the metal can be Zn. The RFBs can also utilize a second electrolyte having $I^-$, anions of $I_x$ (for $x \geq 3$), or both in an aqueous solution, wherein the $I^-$ and the anions of $I_x$ (for $x \geq 3$) compose an active redox couple in a second half-cell.

11 Claims, 5 Drawing Sheets

(56) References Cited

OTHER PUBLICATIONS

International Search Report and Written Opinion from International application No. PCT/US2014/042660, dated Oct. 28, 2014, 9pp.
Skyllas-Kazacos et al. "Evaluation of iodide and titanium halide redox couple combinations for common electrolyte redox flow cell systems," *Journal of Applied Electrochemistry*, 41(10): 1233-1243; 2011.
Soloveichik, Grigorii L. "Battery technologies for large-scale stationary energy storage," *Annual Review of Chemical and Biomolecular Engineering*, vol. 2: 503-527; 2011.
Zhao, Yu, et al., "High-performance rechargeable lithium-iodine batteries using triiodid/iodide redox couples in an aqueous cathode," Nature Communications, May 21, 2013, pp. 1-7, Macmillan Publishers Limited, www.nature.com/naturecommunications.
Zhao, Yu, et al., "High-Performance Lithium-Iodine Flow Battery," Advanced Energy Materials, 2013, pp. 1-6, Wiley, www.wileyonlinelibrary.com.
International Search Report and Written Opinion issued by Korean Intellectual Property Office on Jun. 29, 2015, for International Application No. PCT/US2015/023379, 9pp.
U.S. Appl. No. 14/294,391, filed Jun. 3, 2014.
Xu, Kang. "Nonaqueous liquid electrolytes for lithium-based rechargeable batteries." *Chemical Reviews*. vol. 104, No. 10, pp. 4303-4418, 2004.
Weber et al., "Redox flow batteries: a review," *J. Appl. Electrochem.*, vol. 41, pp. 1137-1164, Sep. 2, 2011.
Vetter, Klaus J., *Electrochemical Kinetics: Theoretical and Experimental Aspects*, Academic Press, New York, pp. 470-481, 1967.
Bard, Allan J., *Electrochemical Methods Fundamentals and Applications: Second Edition*, John Wiley & Sons, Inc., pp. 222-225 and 808-809, Dec. 2000.

\* cited by examiner

HIGH-ENERGY-DENSITY, AQUEOUS, METAL-POLYIODIDE REDOX FLOW BATTERIES

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

High energy density and high energy efficiency are critical qualities for increasing success in renewable clean energy applications. Redox flow batteries (RFBs) can meet many needs by providing conversion between electrical energy and chemical energy. However, RFBs can be associated with low energy density and high cost due to the low concentration of active materials and the use of expensive catalysts and/or membranes. For example, the energy density of a traditional all-vanadium redox flow battery is in the range of approximately 20-50 Wh/L depending on the choice of electrolyte. Traditional zinc-based flow batteries, such as a Zn—Br flow battery (ZBB), demonstrate slightly higher values of energy density. However, the performance of common ZBBs are often limited by their low energy efficiency and short cycling life. Furthermore, the bromine gas is very corrosive and hazardous, leading to serious health and environmental concerns. The low energy density not only limits the application of flow battery to stationary energy storage, but also increases the form factor and cost of the flow battery. Based on the absence of RFBs with high energy density and low cost, there is a need to develop improved flow battery systems.

SUMMARY

Described herein are RFBs utilizing an active redox couple comprising a metal (M) and a divalent cation of the metal ($M^{2+}$) as a first electrode and first electrolyte, respectively. The RFBs also utilize a second electrolyte comprising $I^-$, anions of $I_x$ (for $x \geq 3$), or both in an aqueous solution, wherein the $I^-$ and the anions of $I_x$ (for $x \geq 3$) compose an active redox couple. RFB, as used herein, can refer to a single cell or a stack of cells, wherein each cell comprises a first half cell, a second half cell, and terminals allowing current to flow into and out of the cell. Each half cell can comprise an electrode and/or an electrolyte. A half-cell can further comprise a current collector.

Furthermore, this document describes methods for storing electrical energy in such RFBs. Embodiments described herein can yield high energy density and high efficiency energy storage. In some instances, the experimental discharge energy density is greater than 60 Wh/L. The experimental discharge energy can even exceed 100 Wh/L. The electrochemical activity of $M/M^{2+}$ and the $I^-$/anions of $I_x$ can eliminate the need for expensive catalysts and/or elevated temperatures at either of the electrodes.

In one embodiment, a RFB comprises a first electrolyte comprising $M^{2+}$ in an aqueous solution and a first electrode comprising M, wherein M and $M^{2+}$ compose a first active redox couple at a first half-cell. A second electrolyte comprises $I^-$, anions of $I_x$ (for $x \geq 3$), or both in the aqueous solution, wherein $I^-$ and anions of $I_x$ (for $x \geq 3$) compose a second active redox couple at a second half-cell. A membrane or separator exists between the first and second half-cells. Examples of metals can include, but are not limited to, Ga, Fe, Cr, Ti, Zn, and combinations thereof. In preferred embodiments the metal, M, is Zn.

The first electrode can comprise the metal, M, electrodeposited on a porous conductive material. Examples of porous conductive materials can include, but are not limited to, materials comprising conductive carbon, graphite fibers, graphene, and/or metallic materials. Alternatively, M can be electrodeposited on a dense solid conductive material. The dense solid conductive material can include, but are not limited to, metallic materials and/or conductive carbon materials.

Examples of the membrane can include, but are not limited to, ion-exchange membranes (such as NAFION) and solid-state membranes. Examples of the separator can include, but are not limited to, microporous separators. The separators can comprise polymers or other materials. The ability to use a separator is an unexpected benefit due, in part, to the presence of, and compatability with, the aqueous solution in both half-cells. Furthermore, the lower working potential of $I^-$ and anions of $I_x$ (i.e., 0.621 V for x=3) enables the use of low-cost membranes and relaxes the requirement for expensive sulfonated tetrafluoroethylene based fluoropolymer-copolymer (e.g., "NAFION")

In preferred embodiments, the aqueous solution contains substantially no iodine (e.g., $I_2$), which can tend to precipitate out of solution. Embodiments of the present invention utilize anions of $I_x$ (for $x \geq 3$), which are soluble. Particular examples of anions of $I_x$ (where $x \geq 3$) can include, but are not limited to, $I_3^-$, $I_4^-$, and $I_6^-$. Alternatively, anions of $I_x$ (where $x \geq 3$) can include, but are not limited to $I_{2n+p}^-$, wherein n and p are positive integers and $1 \leq p \leq 4$.

In the presence of alkaline iodide, $I_2$ is predominantly converted to $I_x^-$ (where $x \geq 3$). For example, $I_2$ is in equilibrium with $I_3^-$ according to the following chemical equation.

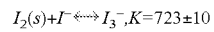

where K represents the equilibrium constant. With such a high equilibrium constant, substantially all the $I_2$ will be transformed into $I_3^-$. However, there can be an insignificant amount of $I_2$ that exists in the equilibrium system. Often the amount is undetectable. Accordingly, the amount of iodine is negligible and there is substantially no $I_2$ in the electrolyte.

Varying the acidity of a negative electrolyte solution can provide an opportunity to expand the voltage window to values approaching 1.9 V. Adjusting the acidity of the negative electrolytes can change the potential at negative side. With increasing pH values, the potential at the negative side decreases because of metal oxide (MO) replacing metal ions, therefore, leading to enhanced overall voltage. The RFBs described herein preferably operate in a substantially neutral or alkaline environment compared to traditional RFBs. In some embodiments, the aqueous solution can have a pH greater than 3. The result is an increase in the overpotential of $H_2/H^+$, which can prevent evolution of hydrogen gas at the negative half-cell, and is beneficial to achieve high CE value and good cycling performance. In addition, the application of the near neutral or alkaline electrolytes in this system also reduces corrosion to the components of the RFB due to acidic environments. Moreover, in many instances no additional mineral acids are added. There is no need for extra free protons. For example, in preferred embodiments, no HCl, $H_2SO_4$, $HNO_3$, etc. needs to be added to the aqueous solution.

In some embodiments, a conduit can connect the first and second half-cells. A flow controller can permit or restrict flow through the conduit. The conduit and flow controller can facilitate controllable flow of electrolyte from the second half-cell to the first half-cell, wherein the electrolyte from the second half-cell can react with the metal (M). The flow controller can permit or restrict circulation through the conduit. Examples of flow controllers can include, but are not limited to, valves, pumps, manifolds, and flow regulators. The anions of $I_x$ (where x≥3) can oxidize the metal into metal cations and corresponding anions of $I_x$ (where x≥3) is reduced into $I^-$. The electrolytes at both sides can be recovered to original electrolytes (e.g. aqueous $MI_2$ solutions).

In some embodiments, a pressure regulation system is used in the containers that contain the first and/or second electrolyte to control and adjust the pressure in the headspace of the electrolyte container. The volume of the first and second electrolyte can be controlled and adjusted, and therefore the capacity decay can be regulated, through the pressure regulation.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 4A is the charge/discharge voltage profile. FIG. 4B shows the flow cell columbic (CE), voltage (VE), and energy efficiencies (EE) over 10 cycles. FIG. 4C demonstrates the specific capacity and energy density (based on positive electrolyte) throughout 10 cycles.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
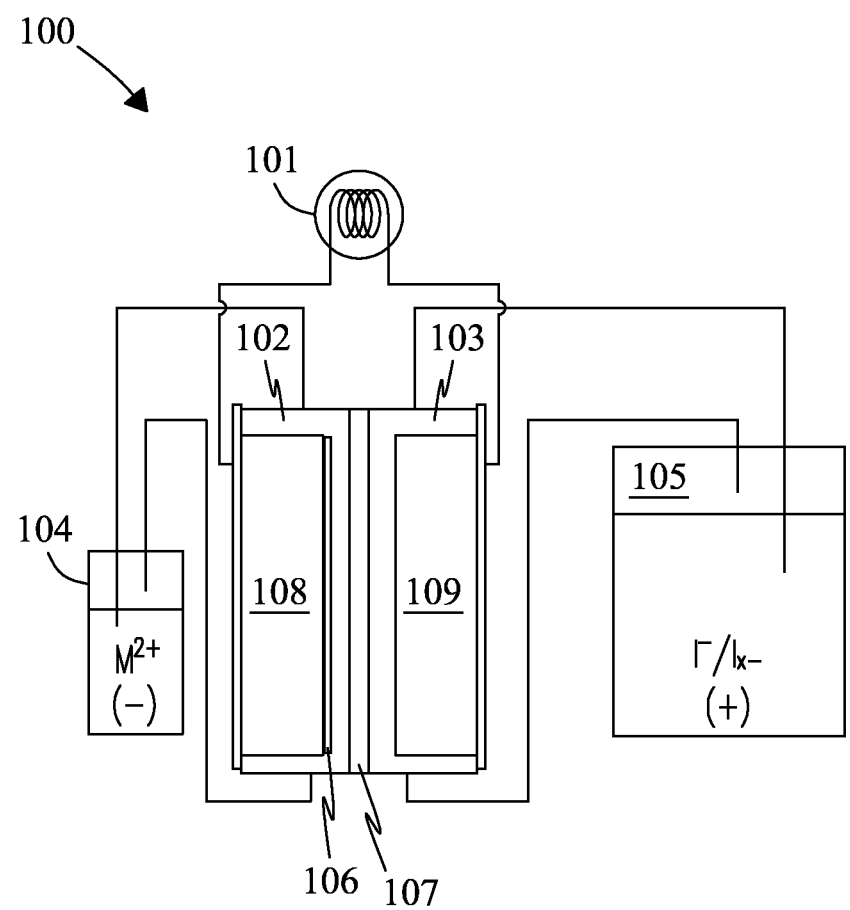
FIG. 1 is a schematic diagram depicting one embodiment of a flow cell employing metal (M) and a divalent cation of the metal ($M^{2+}$) as a first active redox couple along with $I^-$ and anions of $I_x$ (for x≥3) as a second active redox couple according to embodiments of the present invention.

FIGS. 1-6 show a variety of aspects and/or embodiments of the present invention. Referring first to FIG. 1 a schematic diagram depicts a RFB 100 employing a metal and a divalent cation of the metal ($M^{2+}$) as a first active redox couple along with $I^-$ and anions of $I_x$ (for x≥3) as a second active redox couple according to one embodiment of the present invention. The RFB comprises a first half cell 102 separated from a second half cell 103 by a membrane or separator 107. The two half cells can be connected to provide an electrical supply for a load 101. An electrolyte solution comprising $M^{2+}$ cations and iodine anions is separated into catholyte and anolyte in the first and second half cells, respectively. A first reservoir 104 can contain a supply of the catholyte, which can be circulated between the first half cell in a continuous or batch manner. A second reservoir 105 can contain a supply of the anolyte, which can be circulated between the second half cell in a continuous or batch manner. The first and second half cells further comprise a first graphite felt (GF) electrode plus current collector 108 and a second GF electrode plus current collector 109, respectively. The first electrode/current collector 108 further comprises metal (M) that has been electrodeposited 106 on the surface and/or within pores of element 108.

Figure 2:
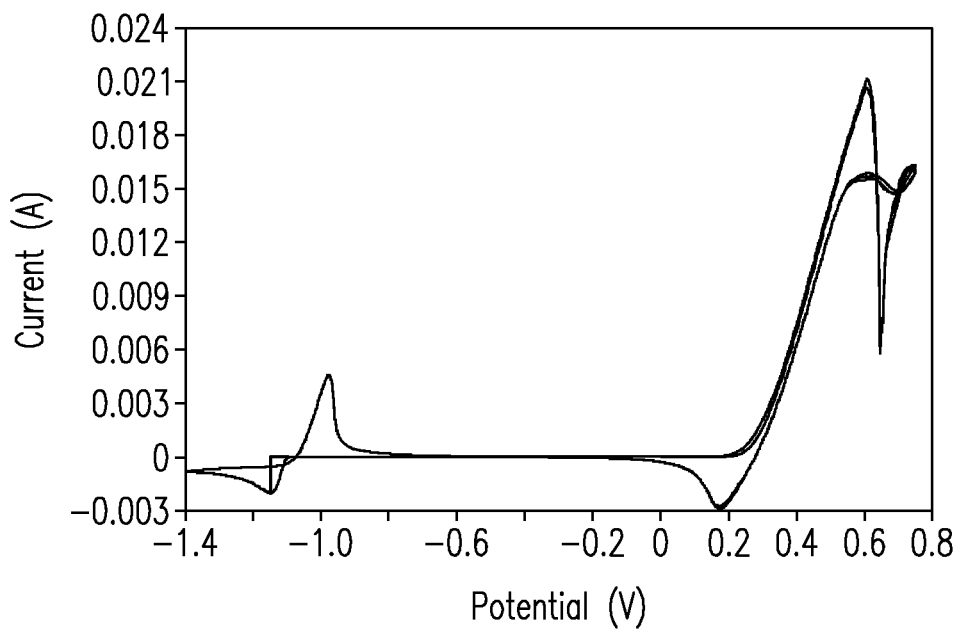
FIG. 2 is a cyclic voltammogram obtained using glassy carbon as working electrode and Ag/AgCl as reference electrode in a 0.085 M $ZnI_2$ electrolyte solution according to embodiments of the present invention.
Figure 3:
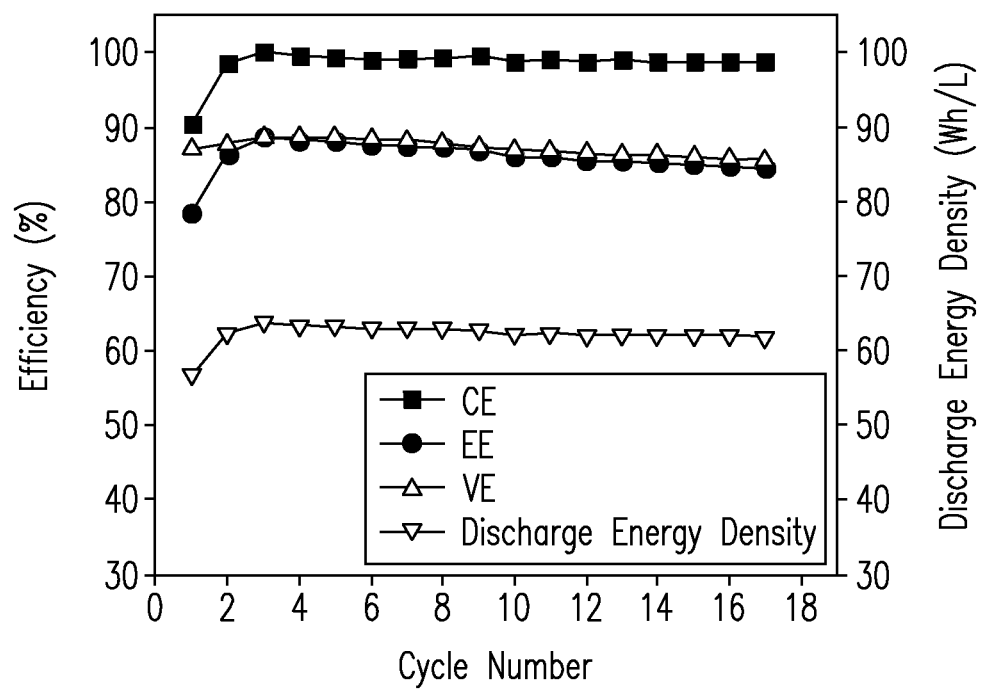
FIG. 3 is a plot showing electrochemical performance of a flow cell with Nafion 212 as membranes and having a 1.5 M $ZnI_2$ electrolyte solution operated at 20 mA/cm$^2$ according to embodiments of the present invention.

The metal (M) can include, but is not limited to Fe, Cr, Ti, Ga, and combinations thereof. The electrolytes of such metals can be prepared, for example, from $FeI_2$, from $CrI_2$ and/or $CrI_3$, from $TiI_4$, $GaI_3$, and combinations thereof. In one embodiment, combined metals can comprise an alloy or a mixture of metals, In one embodiment, a RFB was constructed by dissolving zinc acetate ($Zn(Ac)_2$) in a KI solution to yield an aqueous electrolyte solution. The electrolyte solution can alternatively be made by dissolving $ZnI_2$ in the water. Other methods can also be suitable. In the first half-cell, graphite felt on which Zn is electrodeposited served as an electrode. In the second half-cell, a graphite felt was utilized as an electrode. A sulfonated tetrafluoroethylene based fluoropolymer-copolymer (Nafion 212®) was used as a membrane between the half cells. Referring to FIG. 2, a plot exhibits the coulombic efficiency (CE), energy efficiency (EE), voltage efficiency (VE), and discharge energy density for a cell having 1.5 M $ZnI_2$ solutions in each half cell and operating at a current density of 20 mA/cm². The specific discharge energy density was greater than 60 Wh/L, while the CE, EE, and VE were 99%, 89%, and 88%, respectively.

Figure 4A:
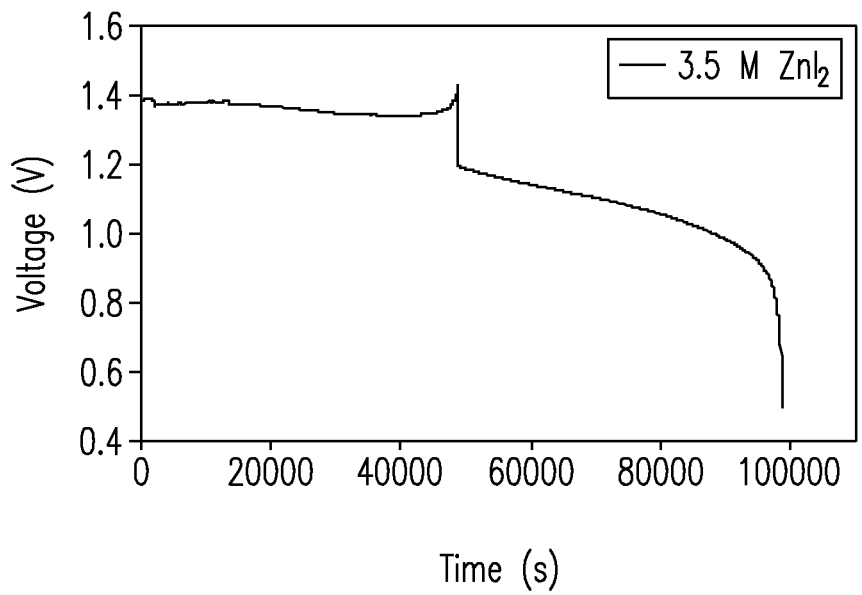
FIGS. 4A-4C contains plots showing electrochemical performance of a flow cell with Nafion 212 as membranes and having a 3.5 M $ZnI_2$ electrolyte solution operated at 20 mA/cm$^2$ according to embodiments of the present invention.
Figure 4B:
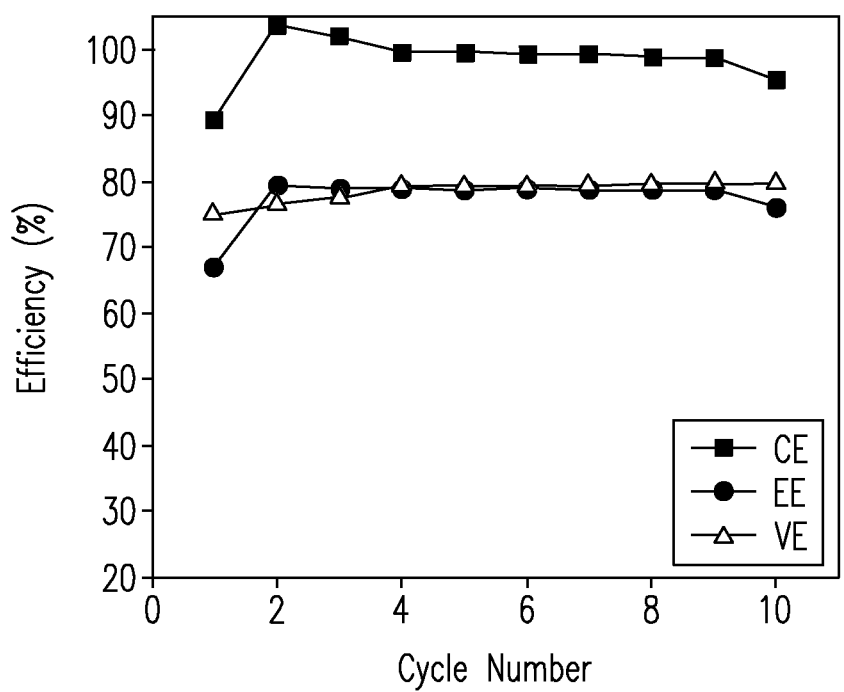
Figure 4C:
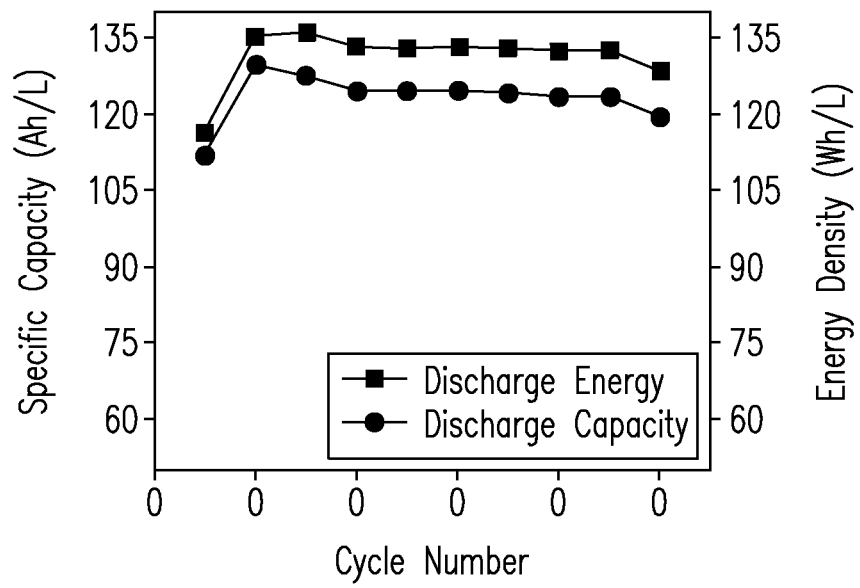
Figure 5:
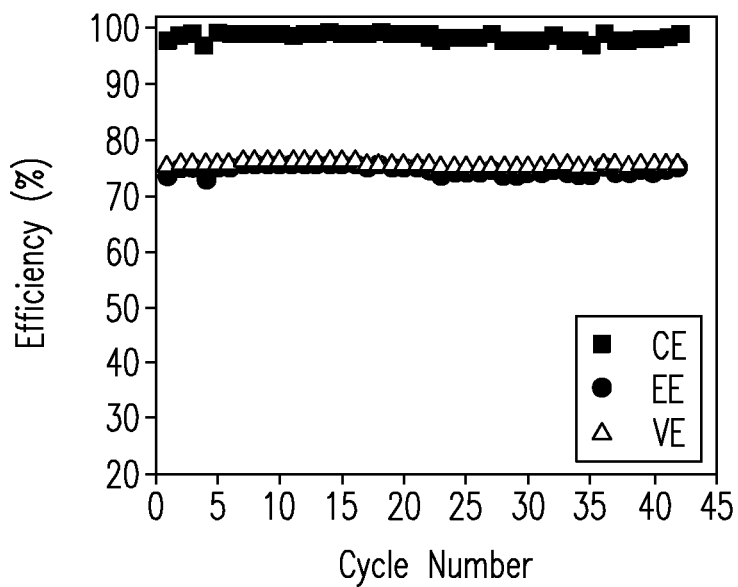
FIG. 5 is a plot showing electrochemical cycling performance of a flow cell with Nafion 115 as membranes and having a 3.5 M $ZnI_2$ electrolyte solution operated at 20 mA/cm$^2$ over 40 cycles according to embodiments of the present invention.

FIGS. 4A-4C show data for a similar cell having 3.5 M $ZnI_2$ solutions operating at a current density of 20 mA/cm². FIG. 4A shows a charge-discharge curve. FIG. 4B shows the CE, VE, and EE values of the cell versus cycle number. FIG. 4C shows the specific capacity and energy density values versus cycle numbers. These values are summarized in Table 1 below, along with data for cells comprising $ZnI_2$ solutions having concentrations of 0.5 M, 1.5 M, and 2.5 M.

| Concentration of $ZnI_2$ (mol/L) | CE (%) | VE (%) | EE (%) | Discharge energy density (Wh/L) | OCV (V) | Charge voltage (V) | Discharge voltage (V) |
|---|---|---|---|---|---|---|---|
| 0.5 | 99.5 | 91.3 | 90.9 | 33.9 | 1.43 | 1.399 | 1.265 |
| 1.5 | 99.3 | 88.7 | 88.2 | 63.4 | 1.33 | 1.343 | 1.185 |
| 2.5 | 99.0 | 85.7 | 84.8 | 98.3 | 1.285 | 1.321 | 1.132 |
| 3.5 | 99.5 | 77.1 | 77.5 | 136.0 | 1.270 | 1.362 | 1.066 |

According to the data in Table 1, the discharge energy density increases with increasing concentrations of $ZnI_2$. The discharge energy density for the cell with 0.5 M $ZnI_2$ is comparable to that of all-vanadium flow batteries (VRB). The discharge energy density for the cell with 1.5 M $ZnI_2$ is comparable to traditional zinc-bromide flow batteries. At $ZnI_2$ concentrations of 3.5 M, the discharge energy density is approximately 5 times greater than the performance of a VRB. The discharge energy density can be further increased when the issue of Zn dendrite formation is addressed. For example, at 5 M $ZnI_2$, the discharge energy density is greater than 148 Wh/L. The charge voltage, discharge voltage and OCV were 1.40 V, 0.97 V, and 1.23 V, respectively. The CE, VE, and EE values were 99.5, 69.3, and 69.1, respectively.

The impact of Zn dendrite formation can be minimized by using thick membranes, increasing electrode-to-membrane separation distances, adding anti-dendrite electrolyte additives, and other techniques. For example, referring to FIG. 5, a flow cell having an electrolyte solution comprising 3.5 M $ZnI_2$ exhibited stable cycling for more than 40 cycles at 20 mA/cm² current density using a thick sulfonated tetrafluoroethylene based fluoropolymer-copolymer separator (Nafion 115®). The CE, VE, and EE were 99%, 76%, and 75%, respectively.

Figure 6:
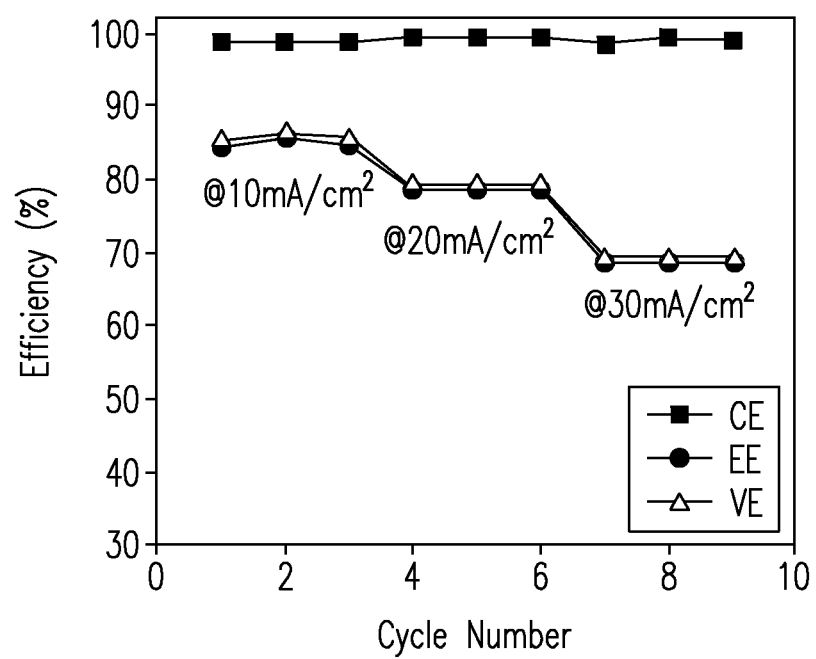
FIG. 6 is a plot comparing electrochemical performance (efficiencies) operated at various current densities of a flow cell having a 3.5 M $ZnI_2$ electrolyte solution according to embodiments of the present invention.

Referring to FIG. 6, efficiencies of a flow cell having 3.5 M $ZnI_2$ at various current densities are shown. The CE is stable at around 99%. The EE and VE decrease at increasing current densities, because the high charge/discharge current density can result in increased overpotential. Table 2 summarizes data obtained from the flow cell having 3.5 M $ZnI_2$ at various current densities.

| Current density (mA/cm2) | OCV (V) | Charge voltage (V) | Discharge voltage (V) | Discharge energy density (Wh/L) |
|---|---|---|---|---|
| 10 | 1.240 | 1.298 | 1.108 | 141.5 |
| 20 | 1.270 | 1.362 | 1.066 | 136.0 |
| 30 | 1.243 | 1.416 | 0.983 | 125.3 |

$I_2$ has a very low solubility in water (around 0.002M at 20° C.). Formation of substantial $I_2$ will precipitate out from the electrolyte as solid. In some of the embodiments described herein, the batteries and methods for operation are designed to avoid the oxidation of I⁻ and anions of $I_x$ into $I_2$. No solid precipitation has been observed in the embodiments described herein, indicating there is substantially no $I_2$ formation or that the formation of $I_2$ is within its very low solubility limit.

Other anions of $I_x$ are possible and can be in solution with $I_3^-$ or instead of $I_3^-$. For example, further charge (oxidation) of $I_3^-$ may result in polyiodide anions that has more than three iodide ions, such as $I_5^-$, and/or $I_7^-$, and/or polyiodide anions with even more iodide ions. In such case, it is preferable that the $I_x$ anions are soluble. If the polyiodide anions are soluble without precipitation, they may offer higher capacity compared to triiodides ($I_3^-$).

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A redox flow battery (RFB) comprising:
    a first electrolyte comprising $Zn^{2+}$ in an aqueous solution and a first electrode comprising Zn, wherein the Zn and the $Zn^{2+}$ compose a first active redox couple at a first half-cell;
    a second electrolyte comprising I⁻, anions of $I_x$ (x≥3), or both in the aqueous solution, wherein the I⁻ and the anions of $I_x$ compose a second active redox couple at a second half-cell; and
    a membrane or separator between the first and second half-cells;
    wherein the RFB has an energy density (based on the positive electrolyte) greater than 60 Wh/L and the aqueous solution contains substantially no $I_2$.

2. The RFB of claim 1, wherein the aqueous solution has a pH greater than 3.

3. The RFB of claim 1, wherein the first electrode comprises the Zn on a porous, conductive material.

4. The RFB of claim 3, wherein the porous conductive material comprises conductive carbon, graphite fibers, graphene, or a metallic material.

5. The RFB of claim 1, wherein the first electrode comprises M on a dense solid conductive material.

6. The RFB of claim 1, wherein the membrane comprises an ion-exchange membrane, or a solid-state membrane.

7. The RFB of claim 1, wherein the anions of $I_x$ comprise $I_3^-$.

8. The RFB of claim 1, wherein the anions of $I_x$ comprise $I_4^-$.

9. The RFB of claim 1, wherein the anions of $I_x$ comprise $I_6^-$.

10. The RFB of claim 1, wherein the anions of $I_x$ comprise $I_{2n+p}^-$, wherein n and p are positive integers and 1≤p≤4.

11. The RFB of claim 1, wherein the separator comprises a microporous separator.

* * * * *